(12) United States Patent
Ikuta et al.

(10) Patent No.: US 9,514,778 B2
(45) Date of Patent: Dec. 6, 2016

(54) OPTICAL DISC DEVICE AND SPHERICAL ABERRATION ERROR SIGNAL DETECTION METHOD

(71) Applicant: SONY CORPORATION, Tokyo (JP)

(72) Inventors: Tomoya Ikuta, Kanagawa (JP); Takeshi Kubo, Kanagawa (JP); Takashi Nakao, Tokyo (JP); Kimihiro Saito, Saitama (JP); Kenji Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/974,335

(22) Filed: Dec. 18, 2015

(65) Prior Publication Data
US 2016/0225400 A1    Aug. 4, 2016

(30) Foreign Application Priority Data
Jan. 30, 2015    (JP) .................... 2015-016362

(51) Int. Cl.
| G11B 7/1392 | (2012.01) |
| G11B 7/09 | (2006.01) |
| G11B 7/007 | (2006.01) |
| G11B 7/1378 | (2012.01) |
| G11B 7/085 | (2006.01) |
| G11B 7/1353 | (2012.01) |
| G11B 7/0037 | (2006.01) |

(52) U.S. Cl.
CPC ....... *G11B 7/13927* (2013.01); *G11B 7/00718* (2013.01); *G11B 7/094* (2013.01); *G11B 7/0908* (2013.01); *G11B 7/0941* (2013.01); *G11B 7/0037* (2013.01); *G11B 7/08511* (2013.01); *G11B 7/1353* (2013.01); *G11B 7/1378* (2013.01)

(58) Field of Classification Search
None
See application file for complete search history.

(56) References Cited

U.S. PATENT DOCUMENTS

2002/0166945 A1* 11/2002 Tadano ............. G11B 7/13927
250/201.1

FOREIGN PATENT DOCUMENTS

| JP | 2001-307349 | 11/2001 |
| JP | 2002-190125 | 7/2002 |

* cited by examiner

*Primary Examiner* — Brian Butcher
(74) *Attorney, Agent, or Firm* — Paratus Law Group, PLLC

(57) ABSTRACT

There is provided an optical disc device that performs recording on a land and a groove, including an optical path splitter configured to split a luminous flux returning from an optical disc into first and second optical paths, a first detector configured to receive a whole of the luminous flux that has passed through the first optical path, a second detector configured to receive a luminous flux of an inside part of the luminous flux that has passed through the second optical path, a spherical aberration error signal generation unit configured to generate a spherical aberration error signal on the basis of a difference between a first focus error signal obtained on the basis of a detection signal of the first detector and a second focus error signal obtained on the basis of a detection signal of the second detector, a spherical aberration correction unit, and an adjustment unit.

8 Claims, 9 Drawing Sheets

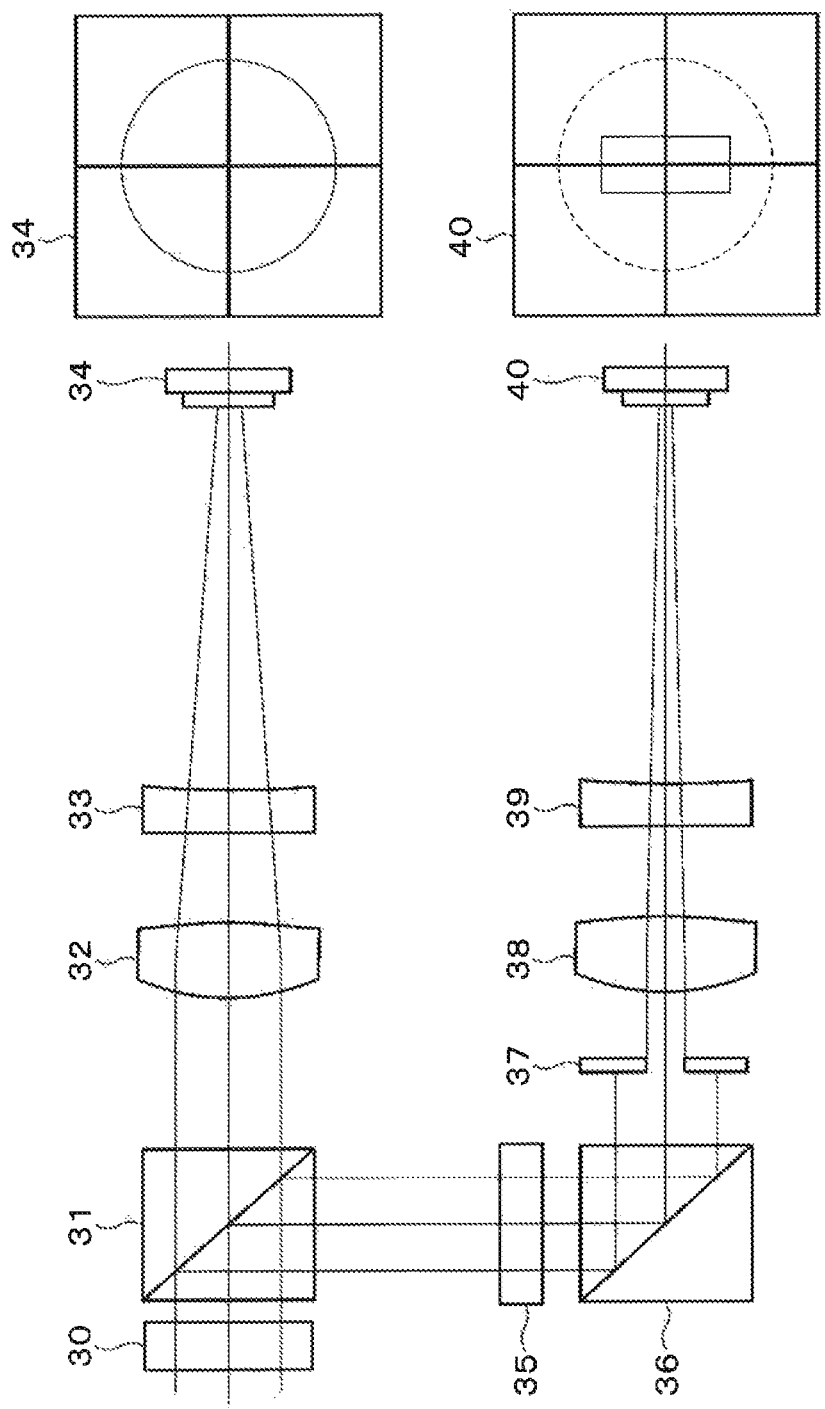

SA ERROR (μm)

SA ERROR (μm)

OPTICAL DISC DEVICE AND SPHERICAL ABERRATION ERROR SIGNAL DETECTION METHOD

CROSS REFERENCE TO RELATED APPLICATIONS

This application claims the benefit of Japanese Priority Patent Application JP 2015-016362 filed Jan. 30, 2015, the entire contents of which are incorporated herein by reference.

BACKGROUND

The present disclosure relates to an optical disc device for reproducing an optical medium such as an optical disc and a spherical aberration error signal detection method.

Spherical aberration (abbreviated as "SA" as appropriate) occurs due to thickness variation of a protective layer (hereinafter, referred to as "cover layer" as appropriate) of an optical disc. Reading performance is deteriorated due to spherical aberration. Spherical aberration is in proportion to a cover layer film thickness error, is in inverse proportion to a wavelength, and is in proportion to the fourth power of an numerical aperture (NA). JP 2002-190125A or JP 2001-307349A discloses that, when spherical aberration occurs, the spherical aberration is detected on the basis of a difference between focus shift amounts of inside and outside parts of a luminous flux by using a difference between a focus position of light beams close to an optical axis and a focus position of light beams far from the optical axis.

A spherical aberration detection signal is supplied to a spherical aberration correcting mechanism and the spherical aberration is corrected. JP 2002-190125A discloses that a lens pair of a concave lens and a convex lens are used as the spherical aberration correcting mechanism and a configuration that changes a distance between those lenses is used.

SUMMARY

JP 2002-190125A or JP 2001-307349A targets an optical disc that performs groove recording. For example, a Blu-ray Disc (registered trademark) (BD) is a high-density optical disc having a recording capacity of approximately 25 gigabytes with a single layer on one side and a recording capacity of approximately 50 gigabytes with a dual layer on one side. In a BD standard, in order to reduce a beam spot diameter, a wavelength of a light source is set to 405 nm and a numerical aperture (NA) of an objective lens is set to be large, i.e., 0.85. In the BD standard, the spot diameter can be reduced to 0.58 μm.

In order to further increase the recording capacity, it is desirable to use an optical disc in which a method for recording data on both a groove track and a land track (referred to as "land/groove recording method" as appropriate) is adopted. The groove is defined as a part irradiated with laser light when an optical disc is produced, and an area between adjacent grooves is referred to as "land".

In the case of the optical disc in which the land/groove recording method is used, a spherical aberration detection signal obtained at the time of reproducing data in a groove and a spherical aberration detection signal obtained at the time of reproducing data in a land are different. Such a point is not considered in the disclosure of JP 2002-190125A or JP 2001-307349A, and therefore, even in the case where a spherical aberration detection signal obtained in one of a groove and a land is used, spherical aberration of the other one is not favorably corrected.

Therefore, it is desirable to provide an optical disc device and a spherical aberration error signal detection method, each of which is capable of performing optimal spherical aberration correction with respect to both a groove and a land.

According to an embodiment of the present disclosure, there is provided an optical disc device that performs recording on a land and a groove, the optical disc device including: an optical path splitter configured to split a luminous flux returning from an optical disc into a first optical path and a second optical path; a first detector configured to receive a whole of the luminous flux that has passed through the first optical path; a second detector configured to receive a luminous flux of an inside part of the luminous flux that has passed through the second optical path; a spherical aberration error signal generation unit configured to generate a spherical aberration error signal on the basis of a difference between a first focus error signal obtained on the basis of a detection signal of the first detector and a second focus error signal obtained on the basis of a detection signal of the second detector, a spherical aberration correction unit configured to correct spherical aberration upon receipt of the spherical aberration error signal; and an adjustment unit configured to adjust the spherical aberration error signal. The adjustment unit adjusts a servo gain value of the spherical aberration error signal and a convergence value of the spherical aberration error signal to optimal values for each land and each groove.

According to an embodiment of the present disclosure, there is provided a spherical aberration error detection method of an optical disc device that performs recording on a land and a groove, the spherical aberration error detection method including: obtaining a first focus error signal on the basis of a whole of a luminous flux returning from an optical disc; obtaining a second focus error signal on the basis of an inside part of the luminous flux returning from the optical disc; generating a spherical aberration error signal on the basis of the first focus error signal and the second focus error signal; and adjusting a servo gain value of the spherical aberration error signal and a convergence value of the spherical aberration error signal to optimal values for each land and each groove.

According to at least one embodiment, it is possible to set a servo gain value and a convergence value of a spherical aberration error signal to optimal values for a land and set those values to optimal values for a groove. Therefore, it is possible to favorably correct a spherical aberration error. Effects are not necessarily limited to the effects described herein and may be any effect described in the present disclosure.

BRIEF DESCRIPTION OF THE DRAWINGS

FIG. 3 is a schematic diagram used for explaining an optical system for detecting a spherical aberration error;

DETAILED DESCRIPTION OF THE EMBODIMENT(S)

Figure 1:
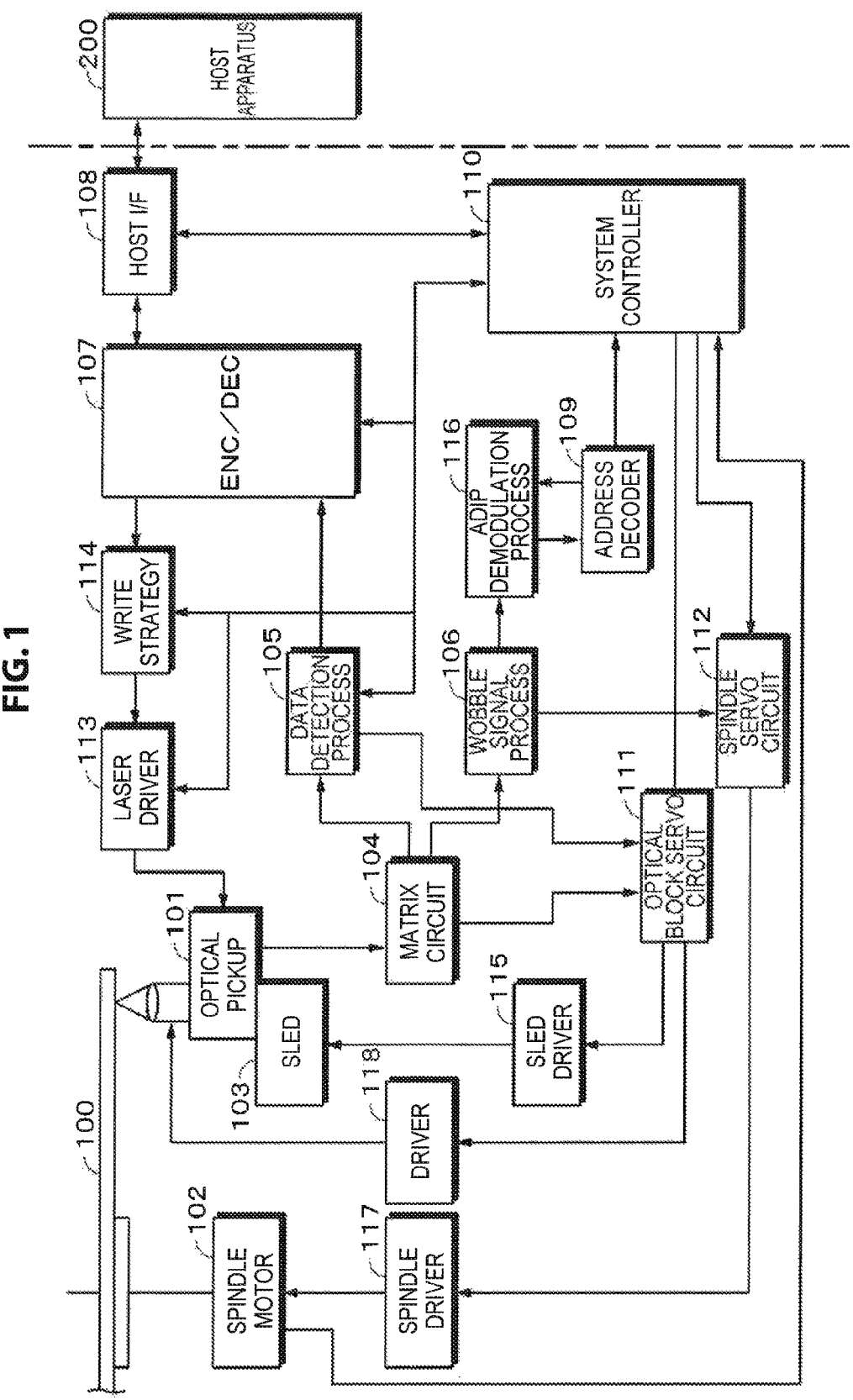
FIG. 1 is a block diagram showing a configuration of an optical disc device.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The embodiments described below are suitable specific examples of the present disclosure, and includes technically preferred various limitations. However, the scope of the present disclosure is not limited to these embodiments, unless limitations to the present disclosure are particularly stated in the description below.

The description below will be provided in the following order.

<1. Embodiment 1>
<2. Modification example>

1. Embodiment 1

Configuration of Optical Disc Device and Optical Disc

As shown in FIG. 1, an optical disc device to which the present disclosure is applied includes an optical pickup 101 that performs recording and reproduction of information on an optical disc 100 serving as an optical recording medium and a spindle motor 102 that rotates the optical disc 100. A sled mechanism 103 is provided to move the optical pickup 101 in a radial direction of the optical disc 100.

There is used, as the optical disc 100, an optical disc in which a method for recording data on both a groove track and a land track (referred to as "land/groove recording method" as appropriate) is adopted. A track formed of a groove is referred to as "groove track". The groove is defined as a part irradiated with laser light when an optical disc is produced. An area between adjacent grooves is referred to as "land", and a track formed of a land is referred to as "land track". In the case of a multilayer optical disc in which a plurality of information recording layers are stacked, the recording capacity can be larger.

In the case where the high-density recordable optical disc 100 is mounted in the optical disc device, the optical disc is rotatably driven by the spindle motor 102 at the time of recording/reproduction at a constant linear velocity (CLV) or a constant angular velocity (CAV). At the time of reproduction, mark information recorded on a track of the optical disc 100 is read out by the optical pickup (optical head) 101. At the time of recording data on the optical disc 100, user data is recorded by the optical pickup 101 on the track of the optical disc 100 as a phase change mark or a pigment change mark.

In the case of a recordable disc, a recording mark using the phase change mark is recorded on a track formed of a wobbling groove, and the phase change mark is recorded by an RLL (1, 7) PP modulation method (RLL; Run Length Limited, PP: Parity preserve/Prohibit rmtr (repeated minimum transition runlength)) or the like. Assuming that a channel clock cycle is "T", the mark length falls within a range of 2T to 8T. In the case of a reproduction-only disc, a groove has not been formed, but data modulated by the RLL (1, 7) PP modulation method has been similarly recorded as an embossed pit array.

As reproduction-only management information, for example, physical information of the disc is recorded by the embossed pit or the wobbling groove in an inner circumferential area or the like of the optical disc 100. Reading out of those kinds of information is also performed by the optical pickup 101. Further, reading out of ADIP information embedded as wobbling of the groove track of the optical disc 100 is also performed by the optical pickup 101.

The optical pickup 101 includes, for example, a laser diode serving as a laser light source, a photodetector for detecting reflected light, an objective lens serving as an output end of laser light, and an optical system that irradiates a recording surface of the disc with laser light through the objective lens and leads reflected light thereof to the photodetector. The objective lens is held in the optical pickup 101 to be movable in a tracking direction and a focus direction by a bi-axial mechanism. The entire optical pickup 101 is movable in the radial direction of the disc by the sled mechanism 103. A driving current is supplied to the laser diode of the optical pickup 101 from a laser driver 113, and the laser diode generates laser light.

Reflected light from the optical disc 100 is detected by the photodetector and is supplied to a matrix circuit 104 as an electric signal corresponding to an amount of received light. The matrix circuit 104 includes a current/voltage conversion circuit, a matrix calculation/amplification circuit, and the like for output currents from a plurality of light-receiving elements serving as photodetectors and generates a necessary signal by performing a matrix calculation process. The current/voltage conversion circuit may be provided in the photodetector element in consideration of a signal transmission quality. For example, a reproduction information signal (RF signal) corresponding to reproduction data and a focus error signal and a tracking error signal for servo control are generated. Further, a signal related to wobbling of a groove, i.e., a push-pull signal is generated as a signal for detecting wobbling.

The optical system that detects spherical aberration is provided in the optical pickup 101, and a spherical aberration correction mechanism that corrects spherical aberration by using a detected spherical aberration detection signal is further provided. Such spherical aberration detection and spherical aberration correction will be described below.

The reproduction information signal output from the matrix circuit 104 is supplied to a data detection processing unit 105, the focus error signal and the tracking error signal output therefrom are supplied to an optical block servo circuit 111, and the push-pull signal output therefrom is supplied to a wobble signal processing circuit 106.

The data detection processing unit 105 performs a binarization process of the reproduction information signal. For example, the data detection processing unit 105 performs an A/D conversion process of the RF signal, a reproduction clock generation process using PLL, a partial response (PR) equalization process, Viterbi decoding (maximum likelihood decoding), and the like and obtains a binary data string by performing a partial response maximum likelihood decoding process (PRML detection method: partial response maximum likelihood detection method). The data detection processing unit 105 supplies the binary data string, which is information read out from the optical disc 100, to an encoding/decoding unit 107 at a latter stage.

The encoding/decoding unit 107 performs a demodulation process of reproduction data at the time of reproduction and a modulation process of record data at the time of recording. That is, the encoding/decoding unit 107 performs data demodulation, de-interleave, ECC decoding, address decoding, and the like at the time of reproduction and performs ECC encoding, interleave, data modulation, and the like at the time of recording.

At the time of reproduction, the binary data string decoded in the data detection processing unit 105 is supplied to the encoding/decoding unit 107. The encoding/decoding unit 107 performs a demodulation process on the binary data string and therefore obtains reproduction data from the optical disc 100. That is, for example, the encoding/decoding unit 107 performs a demodulation process and an ECC decoding process for correcting errors on data which has been subjected to run length limited code modulation such as RLL (1, 7) PP modulation and has been recorded on the optical disc 100 and therefore obtains reproduction data from the optical disc 100.

Data decoded as the reproduction data in the encoding/decoding unit 107 is transmitted to a host interface 108 and is transmitted to a host apparatus 200 in response to an instruction of a system controller 110. The host apparatus 200 is, for example, a computer device or an audio-visual (AV) system apparatus.

When recording/reproduction is performed on the optical disc 100, processing of ADIP information is performed. That is, the push-pull signal that is output from the matrix circuit 104 as a signal related to wobbling of a groove is converted into digitalized wobble data in the wobble signal processing circuit 106. A clock synchronized with the push-pull signal is generated by a PLL process. The wobble data is demodulated to a data stream forming an ADIP address in an ADIP demodulation processing unit 116 and is supplied to an address decoder 109. The address decoder 109 decodes the supplied data to obtain an address value and supplies the address value to the system controller 110.

At the time of recording, record data is transmitted from the host apparatus 200, and the record data is supplied to the encoding/decoding unit 107 via the host interface 108. The encoding/decoding unit 107 performs, as an encoding process of record data, addition of an error correcting code (ECC encoding), interleave, addition of a subcode, and the like. The data subjected to those processes is subjected to the run length limited code modulation such as the RLL (1-7) PP method.

The record data processed in the encoding/decoding unit 107 is supplied to a write strategy unit 114. The write strategy unit 114 performs, as a recording compensation process, laser driving pulse waveform adjustment on characteristics of a recording layer, a spot shape of laser light, a recording linear velocity, and the like. Then, a laser driving pulse is output to the laser driver 113.

The laser driver 113 supplies a current to the laser diode in the optical pickup 101 on the basis of the laser driving pulse subjected to the recording compensation process and emits laser light. Thus, a mark corresponding to the record data is formed on the optical disc 100.

The optical block servo circuit 111 generates various servo drive signals such as focus, tracking, and sled drive signals in accordance with the focus error signal and the tracking error signal supplied from the matrix circuit 104 and performs servo operation. That is, the optical block servo circuit 111 generates a focus drive signal and a tracking drive signal in accordance with the focus error signal and the tracking error signal, and a driver 118 drives a focus coil and a tracking coil of the bi-axial mechanism in the optical pickup 101. Thus, a tracking servo loop and a focus servo loop are formed by the optical pickup 101, the matrix circuit 104, the optical block servo circuit 111, the driver 118, and the bi-axial mechanism.

In response to a track jump instruction from the system controller 110, the optical block servo circuit 111 performs track jump operation by turning off the tracking servo loop and outputting a jump drive signal. Further, the optical block servo circuit 111 generates a sled drive signal on the basis of a sled error signal obtained as a low frequency component of the tracking error signal, access execution control of the system controller 110, and the like, and then a sled driver 115 drives the sled mechanism 103.

Further, a spherical aberration detection signal obtained in the matrix circuit 104 is supplied to the spherical aberration correction mechanism in the optical pickup 101 via the optical block servo circuit 111 and the driver 118 on the basis of the focus error signal obtained in the optical pickup 101, and spherical aberration is corrected.

A spindle servo circuit 112 performs control for CLV-rotating or CAV-rotating the spindle motor 102. The spindle servo circuit 112 generates a spindle error signal by obtaining, as current rotation speed information of the spindle motor 102, the clock generated by PLL for a wobble signal and comparing the clock with predetermined reference speed information. At the time of reproduction of data, a reproduction clock generated by PLL in the data detection processing unit 105 is the current rotation speed information of the spindle motor 102, and therefore the spindle error signal is generated by comparing the reproduction clock with the predetermined reference speed information. Then, the spindle servo circuit 112 outputs a spindle drive signal generated in accordance with the spindle error signal, thereby causing a spindle driver 117 to perform CLV-rotation or CAV-rotation of the spindle motor 102.

The spindle servo circuit 112 generates the spindle drive signal in accordance with a spindle kick/brake control signal supplied from the system controller 110 and also performs operation such as start, stop, acceleration, and deceleration of the spindle motor 102.

Various kinds of operation in such a servo system and a recording/reproduction system are controlled by the system controller 110 including a microcomputer. Processing for optimizing a servo gain value, a spherical aberration convergence value, and a K value regarding a spherical aberration error signal (described below) are also controlled by the system controller 110. The system controller 110 performs various processes in response to commands supplied from the host apparatus 200 via the host interface 108. For example, in the case where a write command is transmitted from the host apparatus 200, the system controller 110 moves the optical pickup 101 to an address where writing is to be performed. Then, the system controller 110 causes the encoding/decoding unit 107 to perform the encoding process on data (e.g., video data or audio data) transmitted from the host apparatus 200 as described above. Then, the laser driver 113 drives emission of laser light in accordance with the encoded data. In this way, recording is performed.

For example, in the case where a read command for requesting transmission of certain data recorded on the optical disc 100 is supplied from the host apparatus 200, the system controller 110 controls seek operation for the specified address. That is, the system controller 110 transmits an instruction to the optical block servo circuit 111 and causes the optical pickup 101 to perform access operation by using the address specified by a seek command as a target. Thereafter, the system controller 110 performs operation control that is necessary to transmit data in such a specified data section to the host apparatus 200. That is, the system controller 110 reads out data from the optical disc 100, causes the data detection processing unit 105 and the encoding/decoding unit 107 to perform reproduction processes, and transmits requested data.

Although the optical disc device connected to the host apparatus 200 has been described in the example of FIG. 1, the optical disc device may or may not be connected to another apparatus. In that case, an operation unit and a display unit are provided, and a configuration of an interface part via which data is input/output differs from that in FIG. 1. That is, it is only necessary to perform recording and reproduction in accordance with user's operation and provide a terminal portion for inputting/outputting various kinds of data. As a matter of course, other various configuration examples of the optical disc device are conceivable.

"Example of Optical Pickup"

Figure 2:
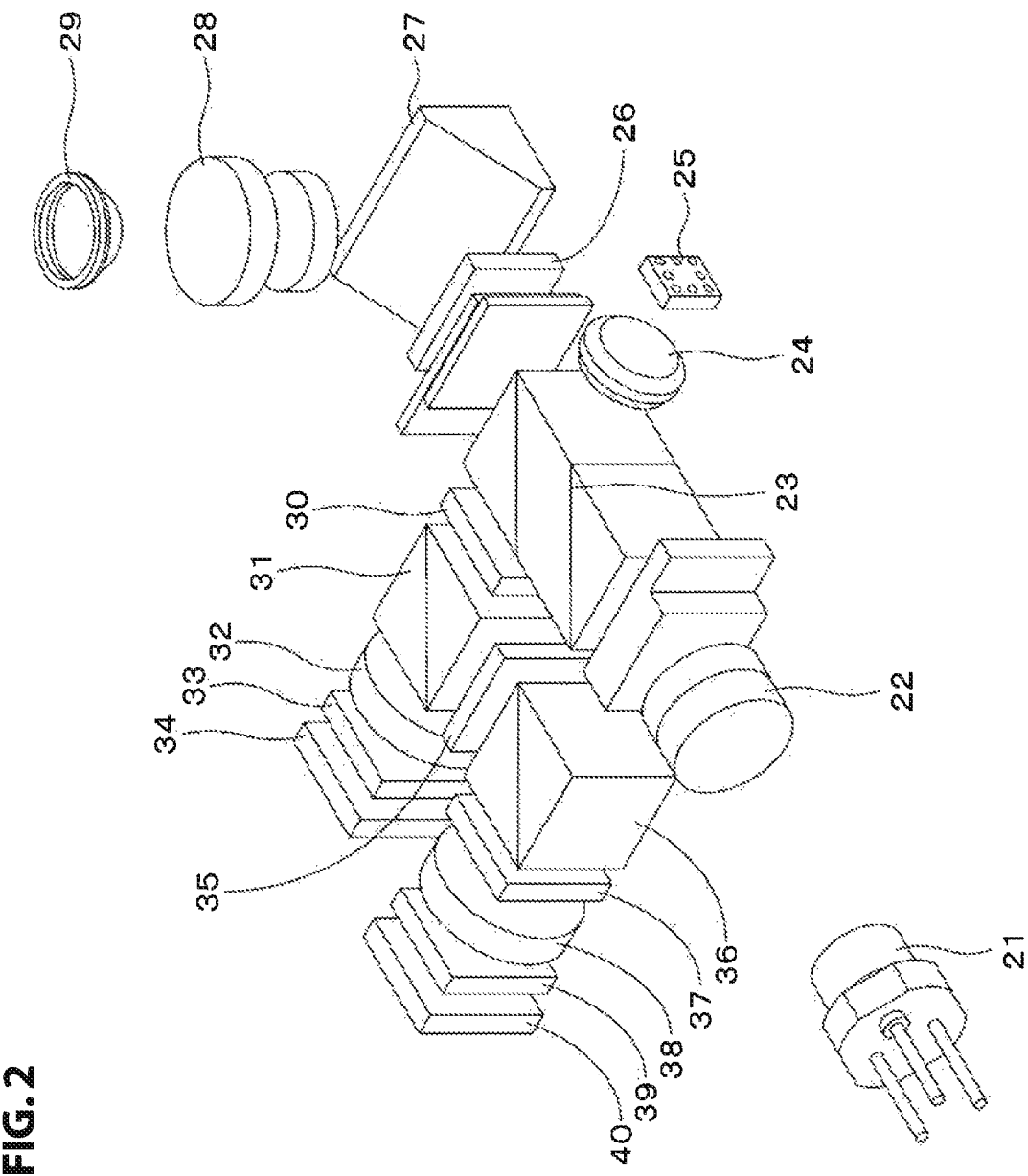
FIG. 2 is a schematic diagram showing a configuration of an optical pickup.

An example of an optical pickup 2 to which the present disclosure is applicable will be described with reference to FIG. 2. The optical pickup 2 includes a laser diode 21 that emits light beams. The emitted light beams of divergent light are converted into parallel light by a collimator lens 22.

Light beams from the collimator lens 22 are supplied to a polarizing beam splitter 23, and partial light beams enter a monitor photodetector 25 via a collimator lens 24. Light beams are controlled to have a predetermined intensity by using a detection signal of the monitor photodetector 25.

The light beams that have passed through the polarizing beam splitter 23 pass through a ¼ wavelength plate 26 to be reflected by a rising mirror 27. Linearly-polarized light is converted into circularly-polarized light by the ¼ wavelength plate 26. The light beams reflected by the rising mirror 27 enter a desired track of the recording surface of the optical disc via a beam expander 28 and an objective lens 29. Spherical aberration is corrected by the beam expander 28.

An example of the beam expander 28 is constituted by a concave lens and a convex lens, and the beam expander 28 changes divergence and convergence of a luminous flux to enter the objective lens 29 by displacing one of the lenses. Another configuration example is a configuration that moves a collimator lens provided in front of the objective lens 29. A spherical aberration detection signal is used as a driving signal for displacing those lenses. Further, a spherical aberration correcting mechanism including a liquid crystal element may be provided.

The light beams reflected on a signal recording surface of the optical disc enter the ¼ wavelength plate 26 via the objective lens 29, the beam expander 28, and the rising mirror 27 and are converted into linearly-polarized light from circularly-polarized light by the ¼ wavelength plate 26. The light beams entering the polarizing beam splitter 23 via the ¼ wavelength plate 26 are reflected and enter a polarizing beam splitter 31 via a λ/2 plate 30.

Also as shown in FIG. 3, a returning path of the optical system is branched into two optical paths by the polarizing beam splitter 31. Light beams in one optical path enter a photodetector 34 via a lens 32 and a collimator lens 33. Light beams in the other optical path enter a polarizing beam splitter 36 via a λ/2 plate 35.

The light beams from the polarizing beam splitter 36 enter a mask 37. The mask 37 allows light beams in a rectangular region having an optical axis center as a center to pass therethrough and blocks light beams in other regions.

The light beams that have passed through the mask 37 enter a photodetector 40 via a lens 38 and a collimator lens 39. Each of the photodetectors 34 and 40 is, for example, a photodetector in which a light-receiving region is divided into four regions. For example, the mask 37 allows only components of the light beams (luminous flux) in the rectangular region in the vicinity of the optical axis to pass therethrough and blocks other components. A shape of a region of the mask 37 through which light beams pass may be not only a rectangle but also a circle, an ellipse, or the like. Further, as a method of limiting a region by dividing light beams into two parts for two optical paths, a hologram element may be used instead of a polarizing beam splitter.

A first optical path passing through the lens 32 and the collimator lens 33 is referred to as "servo and RF optical path", and a second optical path passing through the lens 38 and the collimator lens 39 is referred to as "mask optical path". Light-receiving signals in the respective divided regions of the photodetector 34 are calculated to form a focus error signal FE1. Further, the light-receiving signals in the respective divided regions are added to form a pull-in signal P11. Similarly, light-receiving signals in the respective divided regions of the photodetector 40 are calculated to form a focus error signal FE2. Further, the light-receiving signals in the respective divided regions are added to form a pull-in signal P12. The focus error signals FE1 and FE2 are formed by a known method such as an astigmatism method.

"Calculation of Spherical Aberration Detection Signal (SA Error Signal)"

A spherical aberration detection signal (hereinafter, referred to as "SA error signal" as appropriate) SAE is obtained by the following calculation using the above pull-in signals P11 and P12 and the focus error signals FE1 and FE2. That is, in the case where spherical aberration occurs, among light beams condensed by a lens, light beams close to an optical axis and light beams far from the optical axis are different in focus. Therefore, a difference between a focus error signal of an inside part of a luminous flux and a focus error signal of an outside part thereof indicates spherical aberration.

Regular focus error signal FE=FE1/P11
Inside focus error signal SAE1=FE2/P11
Outside focus error signal SAE2=FE−k*SAE1
SA error signal SAE=SAE2−k*SAE1
SAE=FE−2k*SAE1

In the above expressions, * denotes multiplication, and k denotes a coefficient for correcting a difference between a light amount of the inside part and a light amount of the outside part. Hereinafter, a value of k is referred to as "K value". An inclination of an SA error signal is changed by the K value.

"Experiment and Simulation"

Hereinafter, experiment and simulation will be described. Herein, an optical disc having the following specification was used.

Groove structure: land/groove disc, groove duty 30%
Cover thickness: 65 um (u is a unit symbol meaning micro. The same applies hereinafter.)
Track pitch: 0.45 um (recording and reproduction at linear density of 35.2 GB)

Recording capacity: 50 GB per layer (e.g., three-layer disc)
Groove depth: 12 nm, 23 nm
No wobble
"Difference in SA Error Signal Between Land and Groove"

Figure 4A:
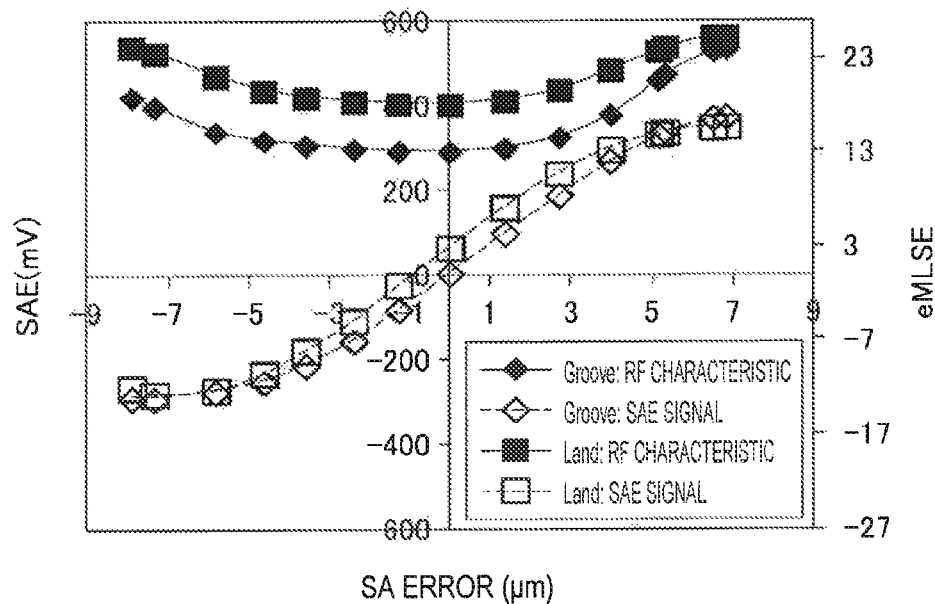
FIG. 4A and FIG. 4B are graphs used for explaining shifts of SA detection errors caused by a difference in offset.
Figure 4B:
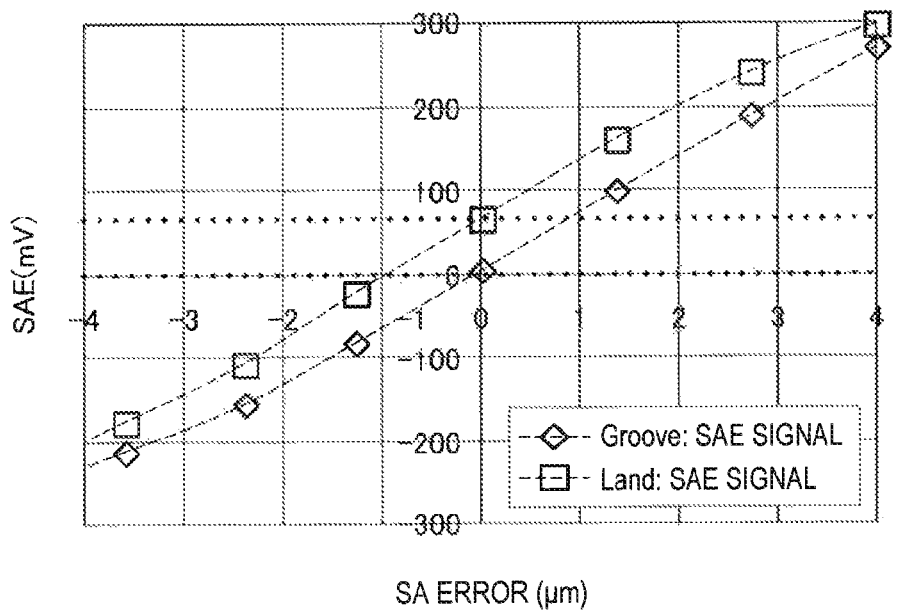

FIGS. 4A and 4B are experiment data showing behavior of SA error signals SAE in a land and a groove. FIGS. 4A and 4B show shifts of SA detection errors caused by offset. A horizontal axis in FIGS. 4A and 4B indicates an SA error (um), and one vertical axis therein indicates a level (mV) of an SA error signal and the other vertical axis indicates e-MLSE.

In the case where recording density is increased as compared with BDXL (registered trademark), a data pattern that easily causes an error is different. As a result, an error of the i-MLSE which is an existing signal index value is problematic. In view of this, in the present disclosure, a signal evaluation value with new data patterns that is necessary to improve accuracy of a signal index value with a higher linear density, which is different from the i-MLSE, is used to explain an effect. Such a new index value having improved accuracy is e-MLSE.

The following three data patterns are added in the e-MLSE.

A bit written as 1 in a pattern string indicates an error pattern, which is a part where bit inversion occurs, as contrasted with a detected pattern.

Additional pattern (1): 10111101
Additional pattern (2): 1011110111101
Additional pattern (3): 10111100111101

With a linear density equivalent to that of an existing BDXL (registered trademark) for which accuracy of the i-MLSE is sufficient, the e-MLSE and the i-MLSE are substantially the same. With a higher linear density, a difference caused by improvement in accuracy appears. Both the e-MLSE and the i-MLSE have the same theoretical correlation between an index value and an error rate which is important in practical use. Therefore, although both the e-MLSE and the i-MLSE are different in calculation and a range of an applicable linear density, evaluation values of signal quality indicated by both the e-MLSE and the i-MLSE may be similarly comprehended. In the present disclosure, an index other than those indexes may be used.

As shown in FIG. 4A, regarding a groove, the e-MLSE is the smallest when an SA error signal is 0 (mV). That is, the smallest e-MLSE is a convergence point (bottom) at which spherical aberration is corrected. Meanwhile, regarding a land, the e-MLSE is the smallest when an SA error signal is 66 (mV). That is, the smallest e-MLSE is a convergence point (bottom) at which spherical aberration is corrected. As described above, the land and the groove are different in optimal offset amount of an SA error signal.

FIG. 4B shows an enlarged part of the graph of FIG. 4A. Assuming that convergence is attempted to be performed at 66 (mV) (or 0 (mV)) in both the land and the groove, an SA error is an approximately 1 (um) in the groove (or the land). Therefore, it is necessary to set a convergence value of an SA error signal (referred to as "SA convergence value") to the land and set a convergence value thereof to the groove to correct spherical aberration. It is possible to detect which one of the land and the groove is scanned on the basis of a polarity of a tracking error signal. Alternatively, land/groove may be determined by using an address in a reading signal.

Figure 5A:
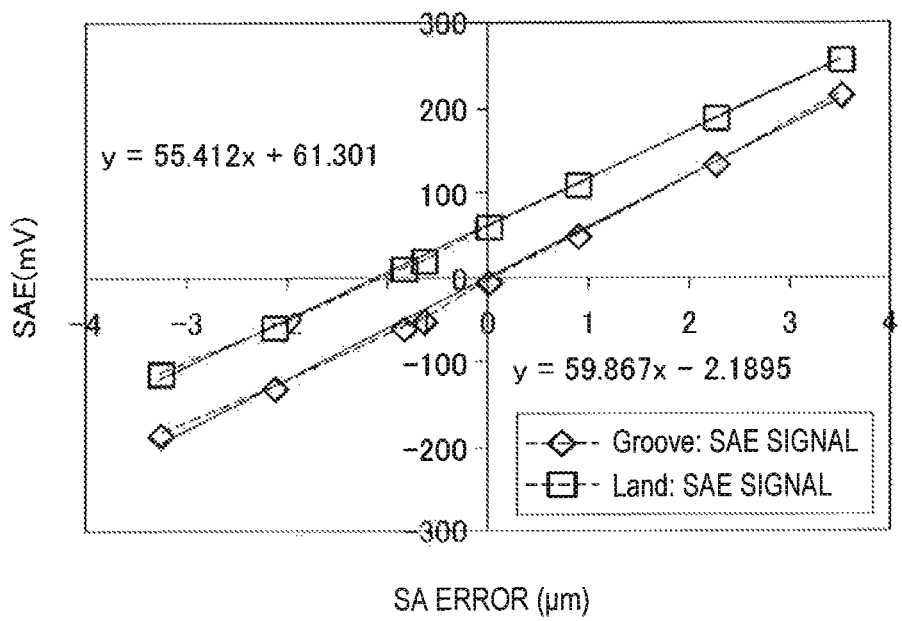
FIG. 5A and FIG. 5B are graphs used for explaining shifts of servo gain setting caused by a difference in inclination.
Figure 5B:
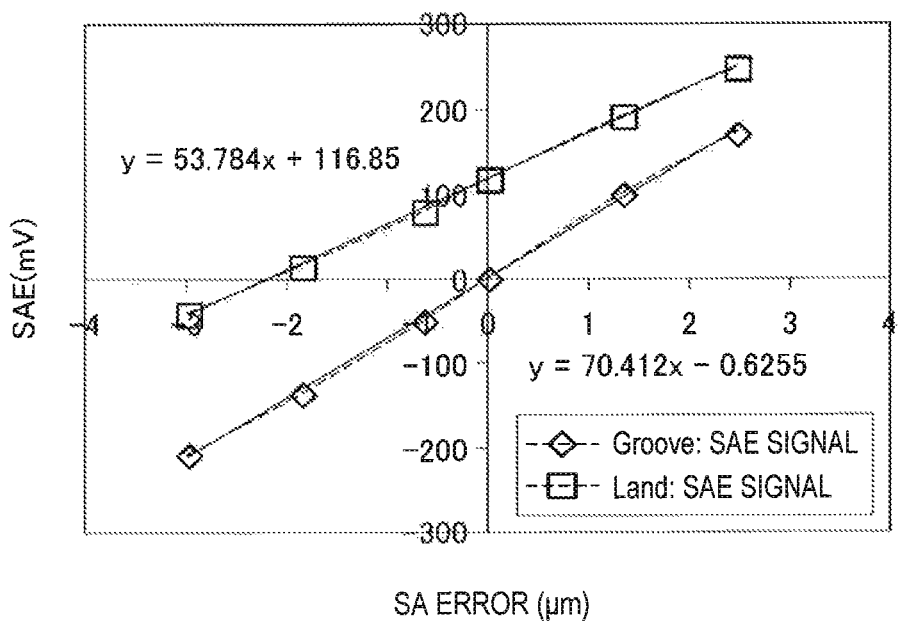

FIGS. 5A and 5B show experiment data showing behavior of SA error signals SAE in a land and a groove. FIGS. 5A and 5B show shifts of servo gain setting caused by a difference in inclination. A horizontal axis in FIGS. 5A and 5B indicates an SA error (um) and a vertical axis therein indicates a level (mV) of an SA error signal. The servo gain settings may or may not be shifted due to a groove depth.

FIG. 5A shows experiment data regarding an optical disc having a groove depth of 12 nm. In the case where a land SA error signal linearly approximates, (y=55.412x+61.301) is obtained. In the case where a groove SA error signal linearly approximates, (y=59.867x−2.1895) is obtained. In this case, the SA error signals have substantially the same inclination. Therefore, stable correction can be achieved in the land and the groove by a common servo gain.

FIG. 5B shows experiment data regarding an optical disc having a groove depth of 23 nm. In the case where a land SA error signal linearly approximates, (y=53.784x+116.85) is obtained. In the case where a groove SA error signal linearly approximates, (y=70.412x−0.6255) is obtained. In this case, the SA error signals are different in inclination. Therefore, in the case where a common servo gain is set, oscillation occurs and convergence is not performed in the groove. Therefore, it is necessary to set a servo gain in accordance with the inclination of the SA error signal in the land and the inclination thereof in the groove and perform stable correction to achieve optimal convergence.

Figure 6:
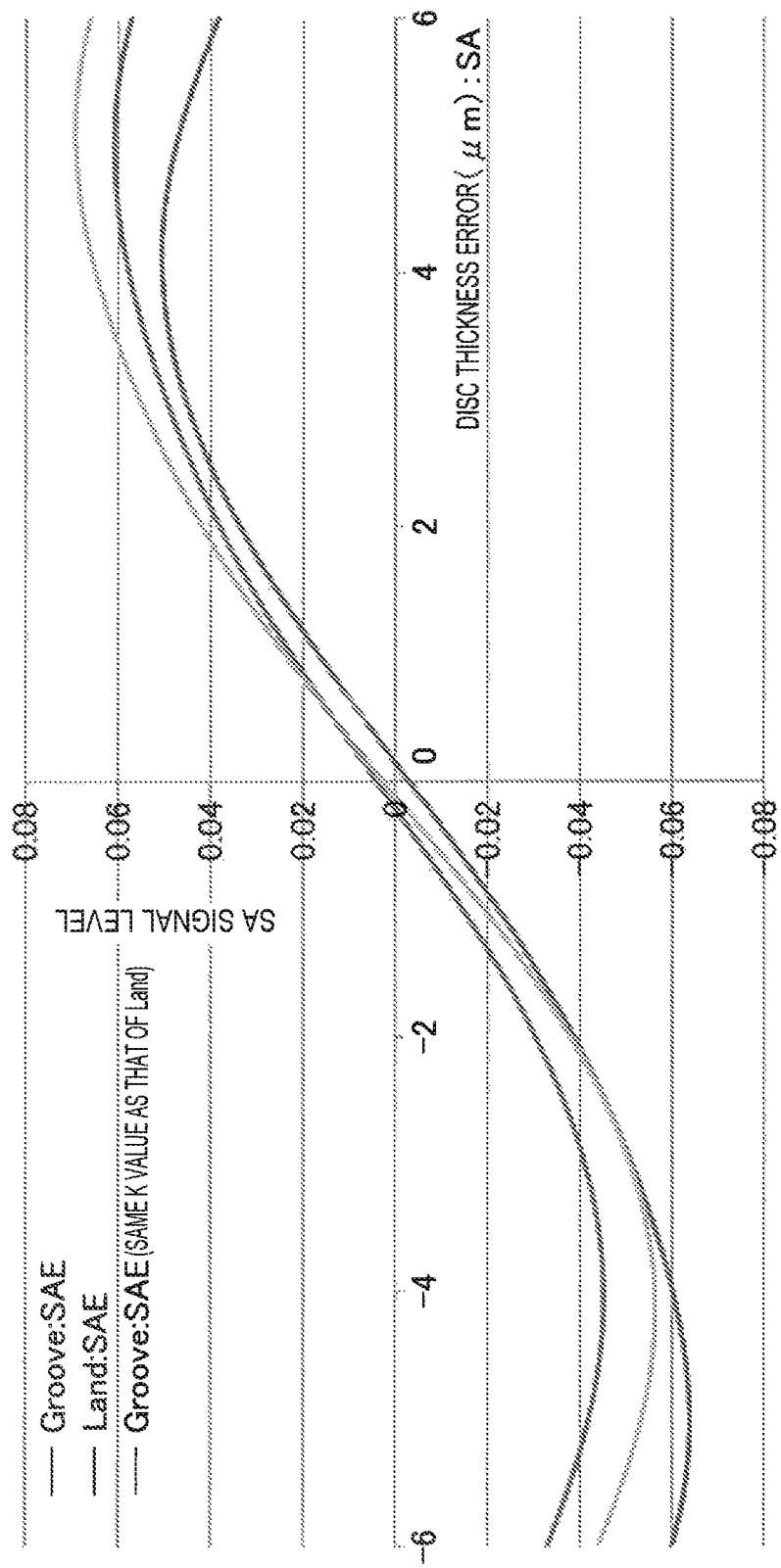
FIG. 6 is a graph showing curved lines of SA error detection signals in the same setting as optimal setting of K values.

FIG. 6 shows levels of SA error signals with respect to spherical aberration caused by a disc thickness error, which shows changes in a groove SA error signal and a land SA error signal which are optimally set and shows a change in a groove SA error signal obtained in the case where the same K value as that of a land is set.

Figure 7A:
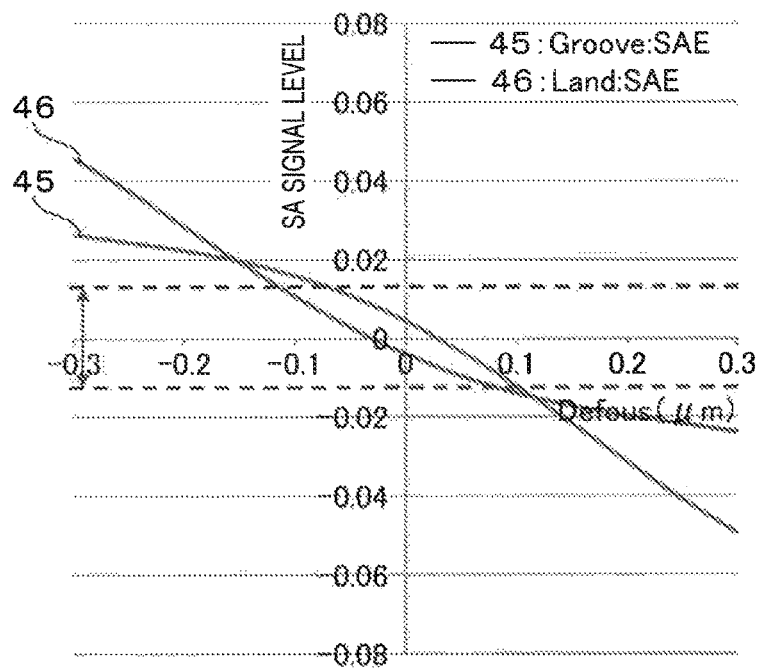
FIG. 7A and FIG. 7B are graphs each of which shows changes in convergence errors caused by a focus shift caused by K value setting.
Figure 7B:
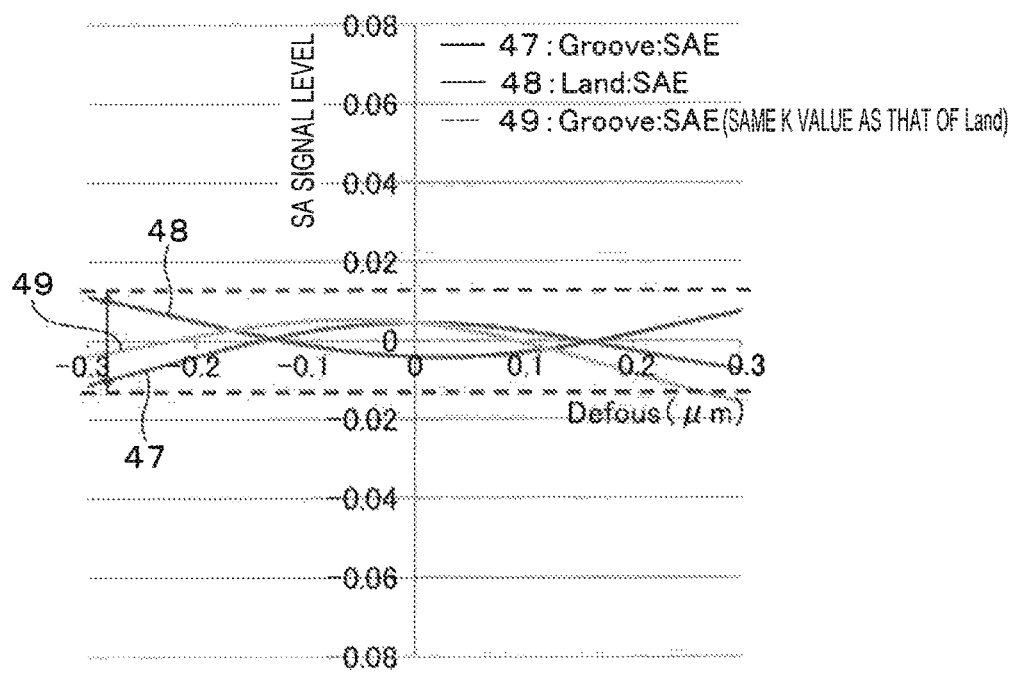

FIGS. 7A and 7B show graphs of simulation results showing behavior of SA error signals SAE in a land and a groove. FIGS. 7A and 7B show shifts of SA detection errors obtained in the case where a focus is changed. A horizontal axis in FIGS. 7A and 7B indicates a focus error (um) and a vertical axis therein indicates a level (mV) of an SA error signal.

FIG. 7A is a graph of a simulation result obtained in the case where the K value is inappropriately set (i.e., in the case where the land and the groove have the same K value). FIG. 7A shows a change 45 in a groove SA error signal obtained in the case where a focus error is changed and a change 46 in a land SA error signal obtained in the case where the focus error is changed. In FIGS. 7A and 7B, offset is removed. As is clear from FIG. 7A, the SA error signals have large errors with respect to the change in the focus error.

FIG. 7B shows a groove SA error signal 47, a land SA error signal 48, and a groove SA error signal (the same K value as that of the land SA error signal is used) 49 obtained in the case where the K values are appropriately set. As is clear from FIG. 7B, errors of the SA error signals can be reduced in the case where a focus error is changed. In the example of FIG. 7B, even in the case where the same K value as that of the land SA error signal is set to the groove SA error signal, the error of the SA error signal can be reduced. However, because the error is not necessarily reduced, it is desirable to set an optimal K value in the land and that in the groove.

The following points are summary of differences in offset, servo gains, and K values of an SA error signal in a land and a groove.

1. A land and a groove are different in offset of an SA error signal. In the case where a common SA convergence value is set in the land and the groove, a detection error occurs. Therefore, it is necessary to determine an optimal SA convergence value in the land and an optimal SA convergence value in the groove.

2. A land and a groove are different in inclination of an SA error signal with respect to an SA error. That is, the land and the groove are different in optimal servo gain value. Therefore, it is necessary to determine an optimal servo gain value in the land and an optimal servo gain value in the groove.

3. In the case where K values are not appropriately set, levels of an SA error signal (SA detection errors) are changed in the land and the groove due to focus errors. Therefore, it is necessary to determine an optimal K value in the land and an optimal K value in the groove.

Inclinations of an SA error signal, offset thereof, and SA detection errors thereof obtained in the case where a focus is changed are changed depending on not only a difference in groove depth but also a difference in kind or configuration of a recording film and a difference in thickness of a cover layer. Therefore, it is necessary to set an SA convergence value, a servo gain value, and a K value in a land and set those values in a groove in each case.

Hereinafter, detection and correction of spherical aberration in the embodiment of the present disclosure will be described. Optimal values (initial values) of an SA convergence value, a servo gain value, and a K value for correcting spherical aberration are set in a land and those values thereof are set in a groove by using an adjustment standard disc when an optical disc device (referred to as "drive" as appropriate) is produced. Those initial values are stored in a nonvolatile memory in each drive. Then, after the disc is inserted, fine adjustment is performed in an actual drive by using the stored values as the initial values. Therefore, stable spherical aberration correction can be performed in both the land and the groove. Hereinafter, an adjustment method in a production process and an adjustment method in an actual drive will be described in order.

"Adjustment Method in Production Process"

Figure 8:
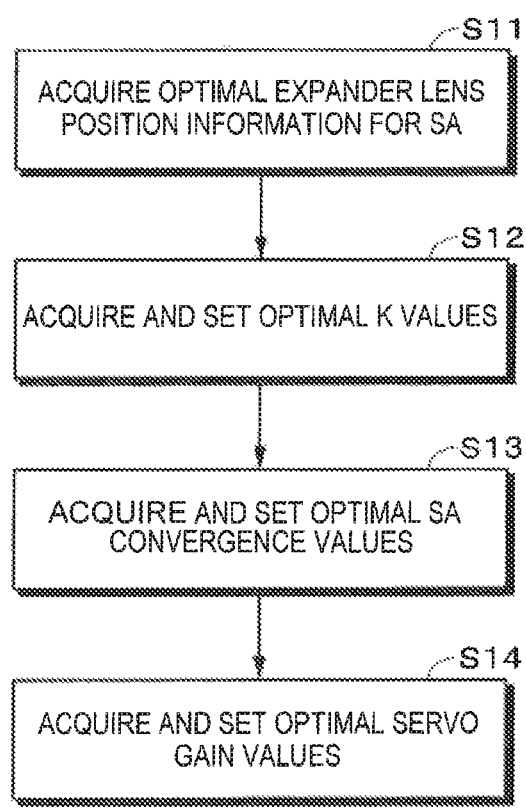
FIG. 8 is a schematic diagram used for explaining an adjustment step at the time of production.

An adjustment method performed when an optical disc device (referred to as "drive" as appropriate) is produced will be described with reference to FIG. 8. In this adjustment method, setting values for a land and a groove are acquired by using an adjustment standard disc in each drive in order to absorb an individual difference.

Step S11 (Optimal Position Information on an Expander Lens for SA is Acquired):

Spherical aberration is changed in a cover layer having a certain thickness. A spherical aberration correction device such as an expander lens is operated, and optimal expander lens position information at a point at which a reproduction characteristic is the most favorable (bottom) is acquired. Specifically, the expander lens is changed in a recording unit of an adjustment standard disc, thereby acquiring a relationship between an RF characteristic and an expander position. The optimal position information is acquired as a value inherent to the land and a value inherent to the groove.

Step S12 (Optimal K Values are Acquired and Set):

The expander lens is fixed at the optimal position acquired in Step S11, and optimal K values that reduce SA detection errors as small as possible when a focus is changed are acquired and set. The optimal K values are a value inherent to the land and a value inherent to the groove.

Specifically, the focus is changed within approximately +/−(which means both + and −) 0.15 um, and the K values are selected so that the SA detection errors fall within approximately +/−0.7 um in the above range.

Herein, a "+/− allowable range AR2 of the SA detection errors set when the focus is changed" is set.

Example: in the case where a servo residue target value of SA detection correction is set to +/−0.9 um, a loss caused by a change in a focus is large, and therefore AR2 is set to approximately +/−0.7 um. A value including offset of an SA error signal obtained when a K value is set with no change in a focus serves as an SA convergence value, and a shift amount from the SA convergence value at the time of defocusing serves as an SA detection error.

Step S13 (Optimal SA convergence values are acquired and set):

The K values are fixed to the optimal values, SA is changed again (expander lens operation), and optimal SA convergence values including offset of the SA error signal at the point at which the reproduction characteristic is the most favorable (bottom) are acquired and set. A setting value inherent to the land and a setting value inherent to the groove are acquired. The expander lens position information does not depend on the K values and is therefore the same as the information that has been initially acquired.

The expander lens is changed in the recording unit of the adjustment standard disc, thereby acquiring a relationship between an RF characteristic and an SA error signal characteristic.

Because the offset may be changed depending on optimization of the K values, the optimal SA convergence values are acquired and set after the K values are determined.

Herein, a "+/− allowable range AR1 of the SA detection errors caused by offset from the SA convergence values" is set.

Example: in the case where the servo residue target value of the SA detection correction is set to +/−0.9 um, AR1 is set to approximately +/−0.1 um in order to prevent a large loss at the time of offset.

Step S14 (Optimal Servo Gain Values are Acquired and Set):

In Step S13 (Acquisition and setting of optimal SA convergence values), inclinations of the SA error signal has been already acquired. Servo gain values optimal for the inclinations are acquired and set. The "servo gain value optimal for an inclination" means a gain value that heads toward a convergence point without oscillation and can reduce an SA detection error as small as possible. The optimal servo gain value for the land and the optimal servo gain value for the groove are acquired and set.

When SA is changed within approximately +/−2.5 um, SA correction is executed, and the servo gain values are selected so that the SA detection errors fall within approximately 0.1 um without oscillation. A correlation between the inclinations of the SA error signal and the servo gain values is also acquired.

Herein, a "+/− allowable range AR3 of the SA detection errors caused by servo gains" is set.

Example: in the case where a servo residue target value of SA detection correction is set to +/−0.9 um, the SA detection errors are desired to be reduced as small as possible by the servo gain values, and therefore the AR3 is set to approximately 0.1 um (and is set not to cause oscillation).

The above procedures are performed in layers having different cover layer thicknesses, and optimal values are acquired and set in a land and a groove in each layer.

"Adjustment Method in Drive"

Figure 9:
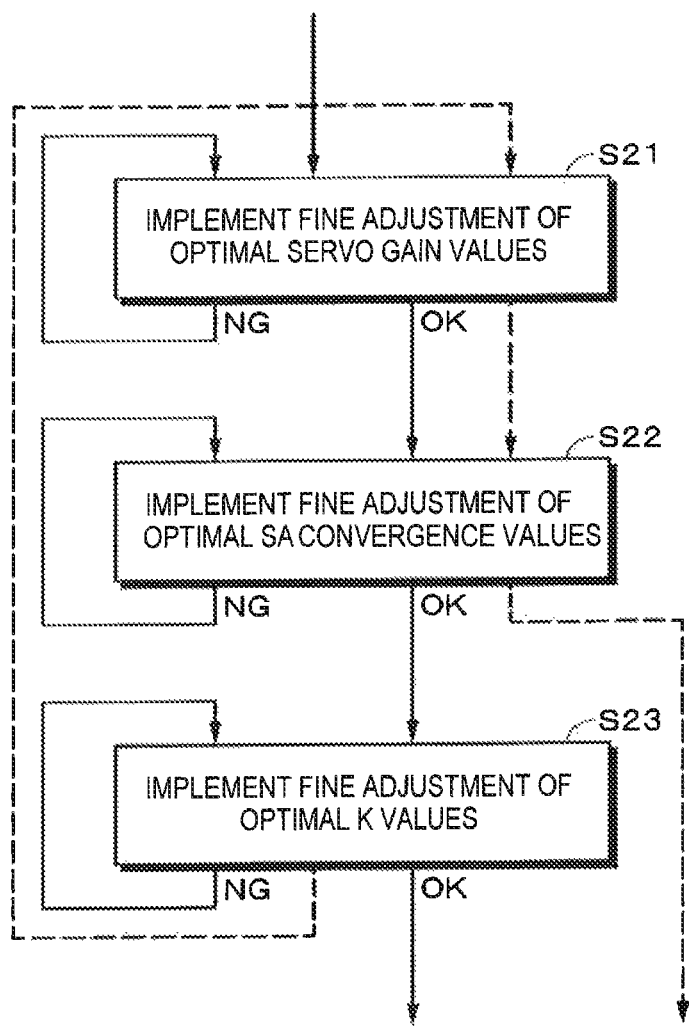
FIG. 9 is a schematic diagram used for explaining an adjustment step in an actual drive.

An adjustment method performed in an actual drive will be described with reference to FIG. 9. In this adjustment method, after an actual optical disc is inserted, setting values for a land and a groove are acquired in each drive. Adjustment is performed after the optical disc is mounted, and then, in the case where recording or reproduction is performed and a large SA error signal is detected at a timing at which the expander lens is movable (at the time of track jump or seek operation), adjustment operation is performed.

In an actual drive adjustment process, the process is initially started by using initial values and whether or not the initial values are correct is checked. In the case where initial K values are NG (which means bad), the process is started again. A route indicated by broken lines in FIG. 9 shows a flow of processing performed in the case where the K values are NG but become OK thereafter.

When the disc is inserted into the drive, the expander lens is operated to achieve SA which is considered to be optimal on the basis of the cover layer thickness. This operation is irrelevant to SA error signal, and the expander lens is operated on the basis of the expander lens position information obtained when the production line adjustment process is performed.

Further, the various kinds of setting values (optimal SA convergence values, optimal K values, and optimal servo gain values) obtained in the production line adjustment process are read and set as initial values.

Step S21 (Fine Adjustment of Optimal Servo Gain Values):

When SA is changed within approximately +/−2.5 um, SA correction is executed, and whether or not the SA detection errors fall within approximately +/−0.1 um of the +/− allowable range AR3 without oscillation is checked.

In the case where the SA detection errors do not fall within the +/− allowable range AR3, optimal servo gain values are set again. Then, when SA is changed within approximately +/−2.5 um, SA correction is executed, and whether or not the SA detection errors fall within the +/− allowable range AR3 is checked again. This step is repeated until the SA detection errors fall within the allowable range AR3.

Step S22 (Fine Adjustment of Optimal SA Convergence Values):

Recording and reproduction are implemented in a trial recording area, and then SA is changed (expander lens operation). Then, whether or not a shift between the point at which the reproduction characteristic is the most favorable (bottom) and the optimal SA convergence values including offset of the set SA error signal falls within approximately +/−0.1 um of the +/− allowable range AR1 is checked.

In the case where the shift does not fall within the +/− allowable range AR1, the optimal SA convergence values are set again. Then, SA correction is executed, recording and reproduction are implemented, SA is changed (expander lens operation), and whether or not the shift between the bottom point and the reset optimal SA convergence values including offset of the SA error signal falls within the +/− allowable range AR1 is checked again. This step is repeated until the shift falls within the allowable range AR1.

Step S23 (Fine Adjustment of Optimal K Values):

The expander lens is fixed in a state in which the SA convergence values are optimal, a focus is changed within approximately +/−0.15 um, and whether or not the SA detection errors fall within approximately +/−0.7 um of the +/− allowable range AR2 in the above range is checked.

In the case where the focus does not fall within the +/− allowable range AR2, optimal K values are set again, the focus is changed again, and whether or not the SA detection errors fall within the +/− allowable range AR2 is checked again. This step is repeated until the SA detection errors fall within the allowable range AR2.

In the case where the K values are subjected to fine adjustment even once, inclinations and offset of the SA error signal may be changed, and therefore the fine adjustment of the optimal servo gain values (Step S21) and the fine adjustment of the optimal SA convergence values (Step S22) are implemented again.

The above procedures are performed in layers having different cover layer thicknesses, and optimal values are acquired and set in a land and a groove in each layer. In the case where a disc is replaced, the above fine adjustment is performed again.

2. Modification Example

Embodiments of the present disclosure have been specifically described in the above description. However, the present disclosure is not limited to the above embodiments, and various modifications based on the technical thoughts of the present disclosure can be implemented. For example, in the above embodiment, a spherical aberration error signal is obtained by comparing a focus error of a whole luminous flux with a focus error of an inside part of the luminous flux. However, a spherical aberration error signal may be obtained by comparing focus errors of (whole luminous flux and outside part of luminous flux) or (outside part of luminous flux and inside part of luminous flux). Also, the configurations, methods, processes, shapes, materials, and numerical values described in the above embodiment can be combined with each other as long as the gist of the present disclosure is not departed.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An optical disc device that performs recording on a land and a groove, the optical disc device including:

an optical path splitter configured to split a luminous flux returning from an optical disc into a first optical path and a second optical path;

a first detector configured to receive a whole of the luminous flux that has passed through the first optical path;

a second detector configured to receive a luminous flux of an inside part of the luminous flux that has passed through the second optical path;

a spherical aberration error signal generation unit configured to generate a spherical aberration error signal on the basis of a difference between a first focus error signal obtained on the basis of a detection signal of the first detector and a second focus error signal obtained on the basis of a detection signal of the second detector;

a spherical aberration correction unit configured to correct spherical aberration upon receipt of the spherical aberration error signal; and an adjustment unit configured to adjust the spherical aberration error signal, wherein the adjustment unit adjusts a servo gain value of the spherical aberration error signal and a convergence value of the spherical aberration error signal to optimal values for each land and each groove.

(2) The optical disc device according to (1), wherein, in a case where the optical disc is a multilayer disc, the adjustment unit adjusts the servo gain value of the spherical aberration error signal and the convergence value of the spherical aberration error signal to the optimal values for each land and each groove in each layer.

(3) The optical disc device according to (1) or (2),
wherein coefficient values used to generate the spherical aberration error signal are different between the land and the groove.

(4) The optical disc device according to any of (1) to (3), wherein the optimal values of the servo gain value of the spherical aberration error signal and the convergence value of the spherical aberration error signal are acquired for each land and each groove at a time of production by using an adjustment standard disc, and the acquired values are held as initial values by the adjustment unit.

(5) A spherical aberration error detection method of an optical disc device that performs recording on a land and a groove, the spherical aberration error detection method including:

obtaining a first focus error signal on the basis of a whole of a luminous flux returning from an optical disc;

obtaining a second focus error signal on the basis of an inside part of the luminous flux returning from the optical disc;

generating a spherical aberration error signal on the basis of the first focus error signal and the second focus error signal; and adjusting a servo gain value of the spherical aberration error signal and a convergence value of the spherical aberration error signal to optimal values for each land and each groove.

(6) The spherical aberration error detection method according to (5),
wherein, in a case where the optical disc is a multilayer disc, the servo gain value of the spherical aberration error signal and the convergence value of the spherical aberration error signal are adjusted to the optimal values for each land and each groove in each layer.

(7) The spherical aberration error detection method according to (5) or (6),
wherein coefficient values used to generate the spherical aberration error signal are different between the land and the groove.

(8) The spherical aberration error detection method according to any of (5) to (7),
wherein the optimal values of the servo gain value of the spherical aberration error signal and the convergence value of the spherical aberration error signal are acquired for each land and each groove at a time of production by using an adjustment standard disc, and the acquired values are held as initial values.

What is claimed is:

1. An optical disc device that performs recording on lands and grooves of an optical disc, the optical disc device comprising:

an optical path splitter configured to split a luminous flux returning from the optical disc into a first optical path and a second optical path;

a first detector configured to receive a whole of the luminous flux that has passed through the first optical path;

a second detector configured to receive a luminous flux of an inside part of the luminous flux that has passed through the second optical path;

a spherical aberration error signal generation unit configured to generate a spherical aberration error signal on the basis of a difference between a first focus error signal obtained on the basis of a detection signal of the first detector and a second focus error signal obtained on the basis of a detection signal of the second detector;

a spherical aberration correction unit configured to correct spherical aberration upon receipt of the spherical aberration error signal; and an adjustment unit configured to adjust the spherical aberration error signal, wherein the adjustment unit adjusts a servo gain value of the spherical aberration error signal and a convergence value of the spherical aberration error signal to optimal values for each land and each groove.

2. The optical disc device according to claim 1,
wherein, in a case where the optical disc is a multilayer disc, the adjustment unit adjusts the servo gain value of the spherical aberration error signal and the convergence value of the spherical aberration error signal to the optimal values for each land and each groove in each layer.

3. The optical disc device according to claim 1,
wherein coefficient values used to generate the spherical aberration error signal are different between the lands and grooves.

4. The optical disc device according to claim 1,
wherein the optimal values of the servo gain value of the spherical aberration error signal and the convergence value of the spherical aberration error signal are acquired for each land and each groove at a time of production by using an adjustment standard disc, and the acquired values are held as initial values by the adjustment unit.

5. A spherical aberration error detection method of an optical disc device that performs recording on lands and grooves, the spherical aberration error detection method comprising:

obtaining a first focus error signal on the basis of a whole of a luminous flux returning from an optical disc;

obtaining a second focus error signal on the basis of an inside part of the luminous flux returning from the optical disc;

generating a spherical aberration error signal on the basis of the first focus error signal and the second focus error signal; and adjusting a servo gain value of the spherical aberration error signal and a convergence value of the spherical aberration error signal to optimal values for each land and each groove.

6. The spherical aberration error detection method according to claim 5,
wherein, in a case where the optical disc is a multilayer disc, the servo gain value of the spherical aberration error signal and the convergence value of the spherical aberration error signal are adjusted to the optimal values for each land and each groove in each layer.

7. The spherical aberration error detection method according to claim 5,
wherein coefficient values used to generate the spherical aberration error signal are different between the lands and grooves.

8. The spherical aberration error detection method according to claim 5,
wherein the optimal values of the servo gain value of the spherical aberration error signal and the convergence value of the spherical aberration error signal are acquired for each land and each groove at a time of production by using an adjustment standard disc, and the acquired values are held as initial values.

* * * * *